United States Patent [19]
Dixon

[11] 3,768,922
[45] Oct. 30, 1973

[54] ROTOR BLADE CONSTRUCTION AND METHOD
[75] Inventor: Thomas P. Dixon, Stratford, Conn.
[73] Assignee: United Aircraft Corporation, East Hartford, Conn.
[22] Filed: Feb. 14, 1972
[21] Appl. No.: 225,778

[52] U.S. Cl..................... 416/61, 416/226, 416/233
[51] Int. Cl. ............................................ B64c 27/46
[58] Field of Search....................... 416/226, 61, 233

[56] References Cited
UNITED STATES PATENTS
| | | | |
|---|---|---|---|
| 2,648,388 | 8/1953 | Haines et al. | 416/226 X |
| 2,767,461 | 10/1956 | Lebold et al. | 29/156.8 |
| 2,954,828 | 10/1960 | Marchetti | 416/226 |
| 3,134,445 | 5/1964 | Hotchkiss | 416/61 |
| 3,667,862 | 6/1972 | Parr | 416/226 X |

FOREIGN PATENTS OR APPLICATIONS
831,380  3/1960  Great Britain..................... 416/226

Primary Examiner—Everette A. Powell, Jr.
Attorney—Maurice B. Tasker et al.

[57] ABSTRACT

A rotor blade has a tubular spar extending lengthwise of the blade which forms the main strength member of the blade. The spar is closed at both ends to contain a gaseous fluid under pressure and has pressure indicating means responsive to pressure loss if a crack forms in the wall of the spar. A continuous outer skin of airfoil section is wrapped chordwise around the spar and extends fore and aft of the spar to form the airfoil contour of the blade. The spaces fore and aft of the spar within the outer skin are filled with a fluid impervious material which may be introduced as a foam. To insure indicator operation based on a pressure drop due to the escape of gas through a crack in the spar, continuous spanwise conduits are provided in the filler material about the outside perimeter of the spar. These conduits communicate with the atmosphere at the blade tip. Several ways are disclosed of forming these conduits.

7 Claims, 5 Drawing Figures

Patented Oct. 30, 1973
3,768,922
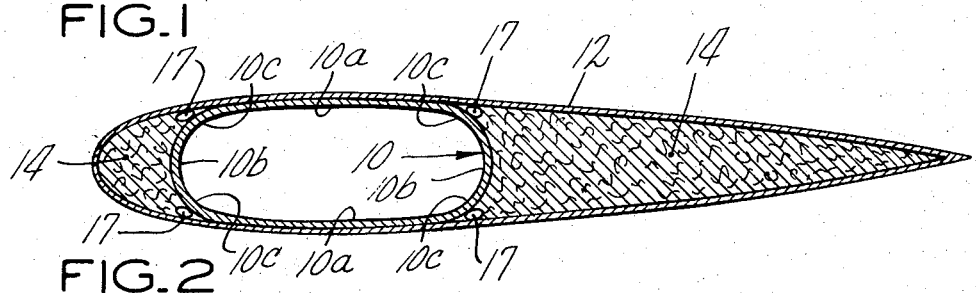
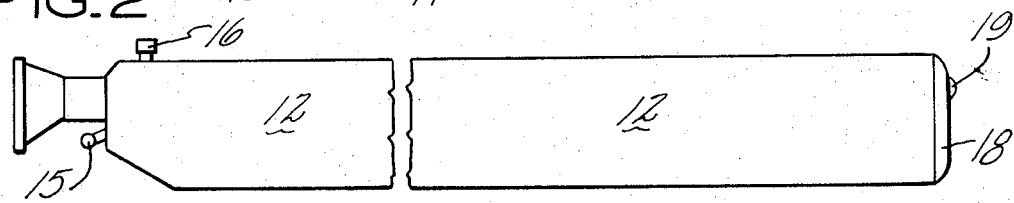
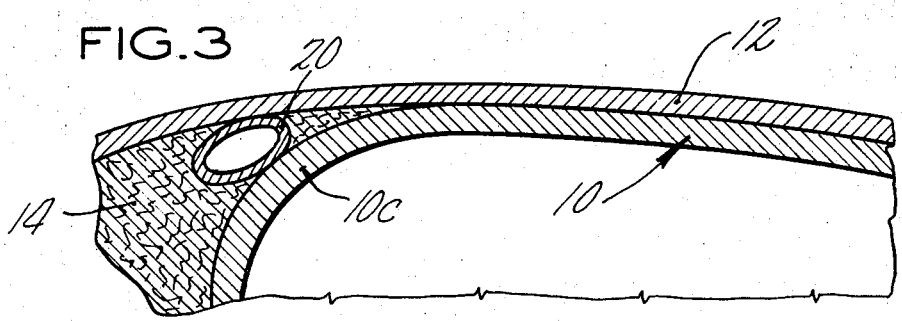
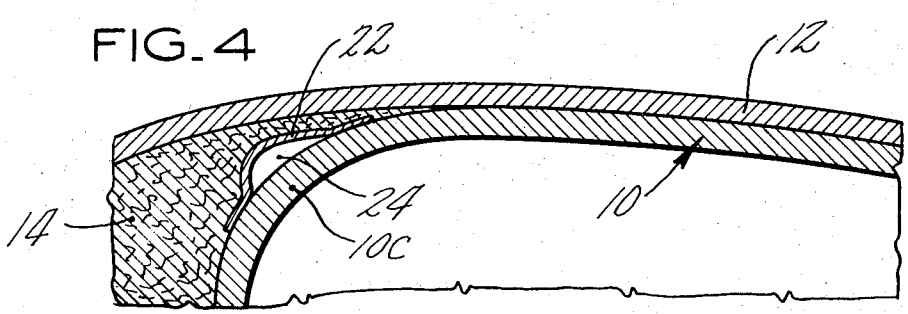
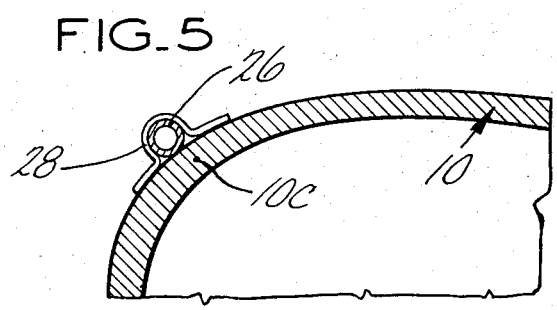

ROTOR BLADE CONSTRUCTION AND METHOD

BACKGROUND OF THE INVENTION

1. Field of the Invention

This invention relates to helicopter rotor blades in which the main strength member of the blade consists of a pressurized hollow spar having pressure indicating means responsive to pressure loss upon the formation of a crack in the wall of the spar.

2. Description of the Prior Art

Prior to this invention the spar has usually constituted the leading portion of the blade and the airfoil contour of the blade has been completed by attaching sheet metal box-like sections to the trailing edge of the spar. This construction allowed leakage of fluid through a pressurized spar to pass directly to atmosphere. A blade of this type is shown in U.S. Pat. No. 2,754,918, issued July 17, 1956 to M. Gluhareff.

SUMMARY OF THE INVENTION

It is an object of this invention to provide a well-defined path from a leaking spar to the atmosphere in rotor blades of the so-called wrap-around type in which the spaces between the spar and the wrap-around skin or cover are filled with a hard, fluid impervious material such as polyeurethane or the like and the complete spar or its critical portions are surrounded either by the skin or by this impervious material.

It is a further object of this invention to provide continuous conduits about the outside perimeter of a pressurized blade spar along its length which communicate with the atmosphere at the blade tip.

It is another object of this invention to provide a method of forming leakage passages in the filler material itself which confront the outer surface of the spar along its length.

It is still another object of this invention to provide means for interconnecting several spanwise leakage passages so that the total volume of all the passages is available to receive leakage fluid discharged from any passage.

A further object of this invention is generally to improve the construction and performance of rotor blades having pressurized spars.

BRIEF DESCRIPTION OF THE DRAWINGS

FIG. 1 is a cross-sectional view of a rotor blade of the wrap-around type embodying the invention;

FIG. 2 is a plan view of the blade with parts broken away to facilitate illustration;

FIG. 3 is a detail view of an enlarged scale of one way of forming a continuous leakage channel in the filler material along the entire length of the spar;

FIG. 4 is a similar detail view of a channel attached to the spar itself; and

FIG. 5 is a detail view of another method of forming the channels in the foam material.

DESCRIPTION OF THE PREFERRED EMBODIMENT

Referring to FIGS. 1 and 2, a rotor blade is shown which has a somewhat flattened tubular spar 10 and a continuous wrap-around shell, or skin, 12 of metal, fiber glass or composite material which overlies the generally parallel flattened portions 10a of the spar and extends fore and aft of the spar to form the airfoil contour of the blade. The skin portion is completed by securing its two edges together at the trailing edge of the blade, as by welding, riveting or bonding. In other embodiments to which this invention is applicable, the trailing aerodynamic portion may merely overlap a portion of the spar, and the closed spar may be of any shape such as circular or elliptical.

In the embodiment shown herein, it will be noted that the flattened portions 10a of the spar conform to the airfoil contour of the blade and that semi-circular portions 10b form rounded "corners" 10c where they are formed into the flattened portions 10a. These "corner" areas 10c will be referred to hereinafter, since they are the high stress areas of the spar where fatigue cracks are most likely to originate.

The spaces within the skin fore and aft of the spar are filled with a hardenable foam material 14 such as polyeurethane or other filler such as honeycomb with the result that the spar at one or more of these critical areas is completely surrounded with fluid impervious material. Spar 10 is adapted to be filled with a gaseous fluid under pressure which is introduced through valve 15. A pressure responsive indicator 16 is provided at the root end of the blade to indicate visually a drop in pressure within the spar which may be the result of a crack in the spar. In order for the indicator 16 to be effective, some means must be provided to conduct the leakage gases away from the spar. It is immaterial to this invention whether the indicator be of the external visual type attached to the blade or whether the cockpit type using a transducer and signal device be used.

In accordance with this invention, channel means 17 (FIG. 1) are provided in the filler material for collecting the leakage gases from a crack in the spar wall and for conducting them spanwise of the blade to a hollow cap 18 which forms a closure for the outboard end of the blade. Channels 17 confront the outer surface of the spar at the rounded "corners" 10c where cracks are most likely to originate. Additional channels may be provided at other locations about the spar if desired. Since all of the channels 17 communicate with cap 18, the total volume of all of the channels and the cap is available as a reservoir to receive leakage gases from the spar. Cap 18 is provided with a vent 19 for the gases which if desired may be controlled by a closure normally held closed by a light spring to prevent entrance of moisture and dirt. Interconnections between channels may be made at various spanwise locations if desired.

THE METHOD

In FIG. 3 one way of forming the channels 17 is shown. Here a resilient type tube 20 is pressed into the arcuate space between the spar and the skin at each of the four rounded "corners" 10c of the spar prior to filling the skin with filler material. When the filler material has hardened, the tube is withdrawn by pulling it longitudinally out of the blade, leaving a channel in the filler material which is in communication with the surface of the spar. Instead of a tube, a rod or cable would be substituted.

In FIG. 4 a different method of forming the channels is shown. Long strips 22 of channel-shaped sheet material, herein of metal, are permanently bonded to the spar at the "corners" 10c before assembly of the blade to provide channels 24 at these locations on the spar.

In FIG. 5 a variation to the first method is shown. Resilient tubes 26 are attached to the spar at the "corners" 10c by tapes 28 before assembly of the blade skin. After the filler material has been introduced and has hardened, the tubes are withdrawn longitudinally as stated, leaving the tapes embedded in the filler material. When the flexible tube is pulled, it becomes smaller in diameter and extracts easily.

The formation of cracks in the spar most often starts at the "corners" of the spar and consequently the channels 17 and 24 are located at these points. If a crack occurs at a point remote from a channel the leakage fluid will eventually find its way across the spar surface to the nearest channel. The leakage fluid flows along the channels into cap 18 which acts as a manifold to collect the leakage fluid from all the channels. From there it is free to escape to the atmosphere through vent 19.

While several specific means have been disclosed for venting fluid from a pressurized spar which is enclosed by fluid impervious material, I do not want to be limited to the exact details of construction shown herein. The use of gaseous fluid leakage channels is equally adaptable to a blade wherein a vacuum is drawn within the blade spar rather than the application of pressure. Obvious modifications within the scope of the following claims will occur to persons skilled in this art.

I claim:

1. A wrap-around rotor blade comprising a tubular spar closed at both ends and adapted to contain a gaseous fluid under pressure, an outer blade skin wrapped about said spar in a fore and aft direction, said skin extending from the root to the tip of the airfoil section and being secured to the blade spar over a limited area at the top and bottom of said spar and extending a substantial distance both fore and aft of said spar to form the airfoil contour of the blade, a mass of fluid impervious filler material occupying all space between said skin and said spar, a pressure responsive indicator carried by said blade and communicating with the interior of said spar, and means associated with said mass of impervious filler including spanwise conduits communicating with the outer surface of said spar for collecting leakage fluid from said spar.

2. The rotor blade of claim 1 in which the impervious filler is a mass of hardenable material which may be introduced as a foam.

3. In a rotor blade, of the wrap-around skin type, a hollow spar extended spanwise of the blade, an outer blade skin attached to said spar and extended chordwise fore and aft beyond said spar to conform to the airfoil contour of the blade, a rigid and fluid-impervious mass of filler material occupying the space between said spar and said skin, and means in said filler material for establishing fluid communication, in the event of a crack in the spar wall, between the interior of said spar and the atmosphere comprising a plurality of spanwise extended channel-forming means located at the juncture between the external surface of said spar and said filler material.

4. The blade of claim 3 in which the spar is closed at both ends and the spar interior is maintained at a differential pressure relative to atmospheric pressure, and chamber means is provided within the blade which is in fluid communication with all of said channel-forming means.

5. The blade of claim 3 in which the spar is a somewhat flattened tubular member the flattened portions of which conform to the airfoil contour of the blade intermediate the chordwise extent of the spar and are in contact with said skin, and said channels are located at the rounded "corners" of said spar fore and aft of said flattened portions.

6. A rotor blade having a tubular pressurized spar adapted to contain a gaseous fluid, an outer shell attached to said spar forming the airfoil contour of the blade and having its ends secured together to form the trailing edge of the blade, a filler of impervious material in said shell occupying the spaces external to said spar, means for collecting gaseous fluid which may escape through a crack in said spar comprising a plurality of spanwise channels formed in the filler material which confront the outer surface of said spar, and pressure responsive means external of said blade communicating with the interior of said spar for indicating loss of pressure in said spar.

7. In a rotor blade, a tubular spar adapted to contain a gaseous fluid under pressure, an outer blade skin wrapped around said spar chordwise of the latter to form the airfoil contour of the blade, a fluid-impervious filler material occupying the space between said spar and said skin, and means for collecting leakage gases from said spar and conducting them through said impervious material including spanwise channels in said material confronting the outer surface of said spar.

* * * * *